June 5, 1923.
S. FURMIDGE
1,457,518
SUPPLEMENTARY VEHICLE SPRING
Original Filed Nov. 13, 1920
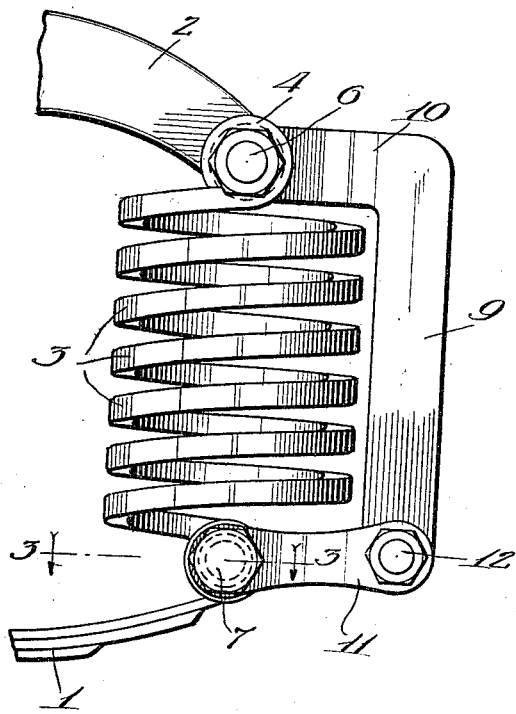
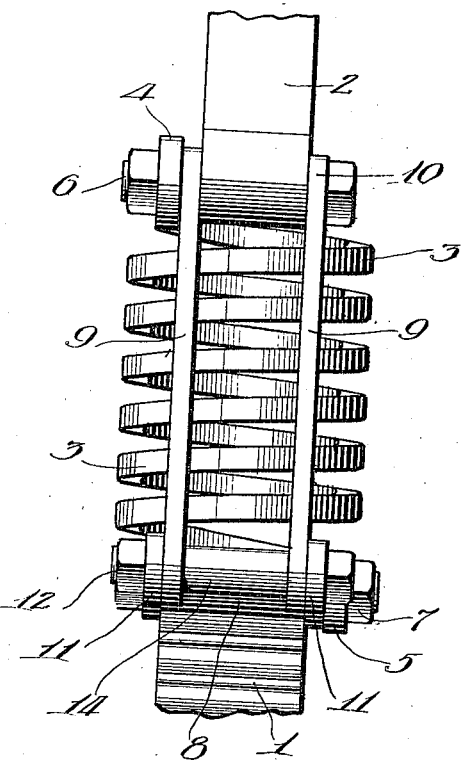
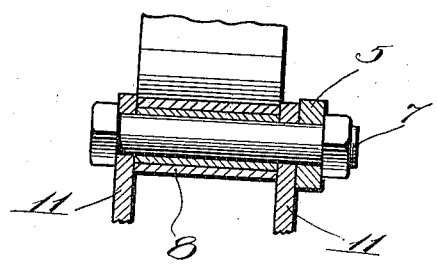
Inventor:
Samuel Furmidge
By Chamberlin & Dreidenreich
Attys Patented June 5, 1923.

1,457,518

UNITED STATES PATENT OFFICE.

SAMUEL FURMIDGE, OF CHICAGO, ILLINOIS, ASSIGNOR, BY MESNE ASSIGNMENTS, TO WILLIAM E. DEE COMPANY, A CORPORATION OF ILLINOIS.

SUPPLEMENTARY VEHICLE SPRING.

Application filed November 13, 1920, Serial No. 423,838. Renewed January 6, 1923.

*To all whom it may concern:*

Be it known that I, SAMUEL FURMIDGE, a citizen of the United States, residing at Chicago, county of Cook, State of Illinois, have invented a certain new and useful Improvement in Supplementary Vehicle Springs, and declare the following to be a full, clear, and exact description of the same, such as will enable others skilled in the art to which it pertains to make and use the same, reference being had to the accompanying drawings, which form a part of this specification.

My invention has for its object to produce a simple and novel attachment for supplementing the action of the springs of vehicles, particularly automobiles and which, specifically considered, will be comparatively inexpensive, easy of attachment, durable, and efficient in operation.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a device constructed in accordance with the present invention, fragments of the spring and frame of an automobile, between which the device is placed, being also shown;

Fig. 2 is a view looking toward the left from the right hand side of Fig. 1; and Fig. 3 is a section taken approximately on line 3—3 of Fig. 1.

Referring to the drawing, 1 represents one end of an ordinary leaf spring and 2 a part of the frame of an automobile to which the spring is ordinarily connected. Between the members 1 and 2 I place a coil spring, 3, the extreme ends of which are bent into vertical rings or eyes, 4 and 5, lying diametrically opposite each other and having their centers in a plane containing the longitudinal axis of the coil spring. The upper end of the spring is connected to the frame member 2 by means of a bolt or pintle, 6, passing through the ring or eye 4 and through the member 2. The lower end of the coil spring is fastened to the end of the main spring by means of a bolt or pintle, 7, passing through the ring or eye, 5, and through the usual eye, 8, on the main spring.

In this arrangement the coil spring is normally under compression but, in the event of an abnormal separation between the members 1 and 2, it may be placed under tension and act effectively as a retarding agent.

It is desirable that some means be provided to give lateral stability in the connection between the main spring and the vehicle frame, and it is also desirable to provide means for limiting the opening and closing movements of the coil spring so as to protect the spring against injury. In accordance with my invention I have adopted a simple expedient serving the combined functions of a steadying device and a spring protecting device. To this end I employ two U-shaped parts the clear length of whose arms is slightly greater than one-half the diameter of the coil spring and the distance between whose arms is approximately equal to the distance between the two eyes or rings at the ends of the coil spring. Each of these two parts is made in two sections one of which is L-shaped, being composed of a long arm, 9, and a short arm, 10, while the other is a simple link, 11, one end of each of these links being pivotally connected to the free end of the long arm of the L-shaped member so as to form with that member an approximately U-shaped device. The pintle or bolt, 6, passes through the free end of the short arm of each of the two L-shaped members while the pintle or bolt, 7, passes through the free ends of the two links 11. The connection between the links 11 and the L-shaped members may conveniently be made by passing a single bolt, 12, lying parallel with the bolts or pintles, 6 and 7, through the links and the lower ends of the long arms of the L-shaped members; a suitable spacing sleeve, 14, being placed around the bolt 12 between the two arms, 9, so as to give lateral rigidity to the structure as a whole. When the parts are assembled as shown, it will be seen that the coil spring may contract and expand freely, within limits, without being interfered with by the steadying device which serves simply as a lateral steadying device. When a certain degree of compression has been obtained, the compression being accompanied by a relative upward swinging of the links, 11, about the pivot, 12, the arms, 9, of the steadying device will be swung into engagement with the sides of the coil spring and prevent the latter from completely closing. The same thing happens when the coil spring is extended, the action in this case being a downward swinging of the links 11 which serves to draw in the arms, 9, against the sides of the coil spring and check the opening of the spring before any harm can be done to the latter.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The combination with a main spring and a member adapted to be cushioned thereby, of a coil spring arranged between said main spring and said member and connected thereto at its ends, a U-shaped steadying device embracing said coil spring, the free end of one arm of said steadying device being pivotally connected to said member at the point of attachment between the latter and the coil spring, the free end of the other arm of said steadying device being pivotally connected to the main spring at the point of attachment between the latter and the coil spring, said U-shaped device being made in two parts pivotally connected together.

2. The combination with a main spring and a member adapted to be cushioned thereby, of a coil spring arranged between said main spring and said member and connected thereto at its ends, a U-shaped steadying device embracing said coil spring, the free end of one arm of said steadying device being pivotally connected to said member at the point of attachment between the latter and the coil spring, the free end of the other arm of said steadying device being pivotally connected to the main spring at the point of attachment between the latter and the coil spring, one of said arms being pivotally connected to the remainder of the U-shaped device, and the axes of said pivotal connections being parallel with each other.

3. The combination with a main spring and a member adapted to be cushioned thereby, of a coil spring arranged vertically between the main spring and said members, elongated pintles arranged at right angles to the plane of movement of said main spring connecting the ends of the coil spring respectively to the main spring and to said member, and two separated parallel U-shaped steadying devices each embracing said spring and connected at its ends to corresponding ends of said pintles.

4. The combination with a main spring and a member adapted to be cushioned thereby, of a coil spring arranged vertically between the main spring and said members, elongated pintles arranged at right angles to the plane of movement of said main spring connecting the ends of the coil spring respectively to the main spring and to said member, and two separated parallel U-shaped steadying devices each embracing said spring and connected at its ends to corresponding ends of said pintles, each of said U-shaped members having at the inner end of one of its arms a hinge joint whose axis is parallel with said pintle.

5. The combination with a main spring and a member adapted to be cushioned thereby, of a coil spring arranged between said main spring and said member, parallel pintles extending transversely of the axis of the main spring connecting the ends of the coil spring to said main spring and said member, a U-shaped steadying device embracing the coil spring and having the free ends of its arms journaled on said pintles, said U-shaped device being made in two parts hinged together so as to be movable relatively about an axis parallel with said pintles.

6. The combination with a main spring and a member adapted to be cushioned thereby, of a coil spring arranged between said main spring and said member, parallel pintles extending transversely of the axis of the main spring connecting the ends of the coil spring to said main spring and said member, a U-shaped steadying device embracing the coil spring and having the free ends of its arms journaled on said pintles, one of said arms being hinged at its inner end to the remainder of said U-shaped device so as to be capable of moving angularly about an axis parallel with the aforesaid pintles.

7. The combination with a main leaf spring and a frame member of approximately the same width as the leaf spring lying above the latter, of a coil spring arranged vertically between said main spring and said member, the upper end of the coil spring being formed into a vertical eye lying on one side of the coil spring, the lower end of the coil spring being formed into a vertical eye lying on the opposite side of the coil spring, two U-shaped devices lying on opposite sides of said member and said main spring, said U-shaped device comprising arms slightly longer than the radius of said coil spring and a connecting piece approximately as long as the coil spring; a horizontal bolt or pintle passing through the upper eye of the coil spring, through the free end of one of the arms of each of said devices and through the aforesaid member; a horizontal bolt or pintle passing through the lower eye of said coil spring, through the free ends of the other arms of said U-shaped devices, and through the end of the main spring; each of said U-shaped devices being made in two parts hinged together for relative movements about a horizontal axis.

8. The combination with a main leaf spring and a frame member of approximately the same width as the leaf spring lying above the latter, of a coil spring arranged vertically between said main spring and said member, the upper end of the coil spring being formed into a vertical eye lying on one side of the coil spring, the lower end of the coil spring being formed into a vertical eye lying on the opposite side of the coil spring, two U-shaped devices lying on opposite sides of said member and said main spring, said U-shaped device comprising arms slightly longer than the radius of said coil spring and a connecting piece approximately as long as the coil spring, a horizontal bolt or pintle passing through the upper eye of the coil spring, through the free end of one of the arms of each of said devices and through the aforesaid member; a horizontal bolt or pintle passing through the lower eye of said coil spring, through the free ends of the other arms of said U-shaped devices, and through the end of the main spring; one of the arms of each of said U-shaped devices being hinged at its inner end to the corresponding connecting piece so as to be movable relatively thereto about a horizontal axis.

9. The combination with a main leaf spring and a frame member of approximately the same width as the leaf spring lying above the latter, of a coil spring arranged vertically between said main spring and said member, the upper end of the coil spring being formed into a vertical eye lying on one side of the coil spring, the lower end of the coil spring being formed into a vertical eye lying on the opposite side of the coil spring, two U-shaped devices lying on opposite sides of said member and said main spring, said U-shaped device comprising arms slightly longer than the radius of said coil spring and a connecting piece approximately as long as the coil spring; a horizontal bolt or pintle passing through the upper eye of the coil spring, through the free end of one of the arms of each of said devices and through the aforesaid member; a horizontal bolt or pintle passing through the lower eye of said coil spring, through the free ends of the other arms of said U-shaped devices, and through the end of the main spring; one of the arms of each of said devices being in the form of a separate piece, a horizontal bolt or pintle passing through the inner end of both of the latter arms and the corresponding ends of the connecting pieces of said U-shaped devices, and a spacing sleeve surrounding the latter bolt or pintle to hold said U-shaped devices in proper spaced relation to each other.

In testimony whereof, I sign this specification.

SAMUEL FURMIDGE.